No. 855,810. PATENTED JUNE 4, 1907.
M. O. REHFUSS & E. F. BUCH.
MACHINE FOR DRILLING AND TUFTING BRUSHES.
APPLICATION FILED DEC. 20, 1905.
9 SHEETS—SHEET 1.
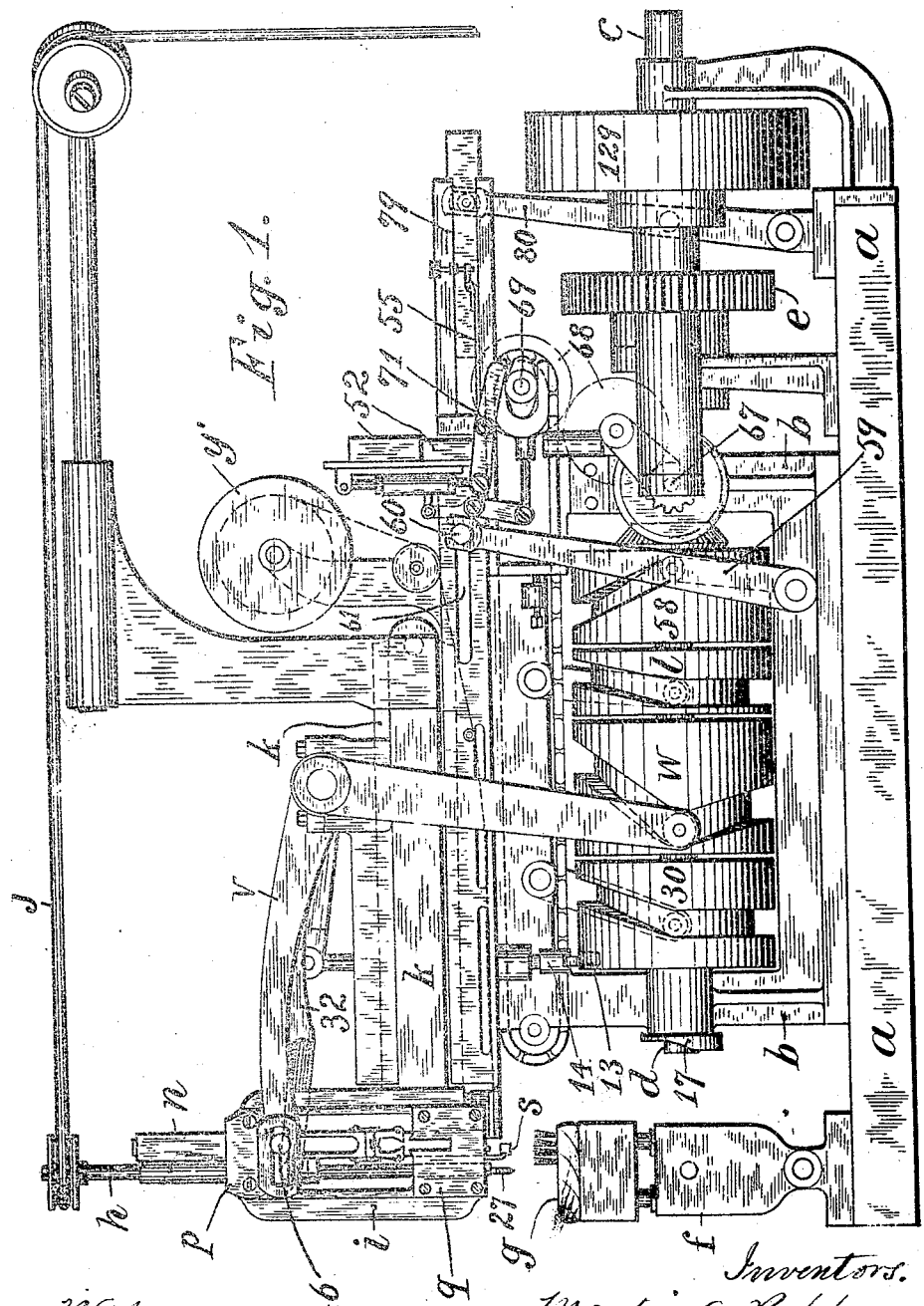

No. 855,810. PATENTED JUNE 4, 1907.
M. O. REHFUSS & E. F. BUCH.
MACHINE FOR DRILLING AND TUFTING BRUSHES.
APPLICATION FILED DEC. 20, 1905.
9 SHEETS—SHEET 2.
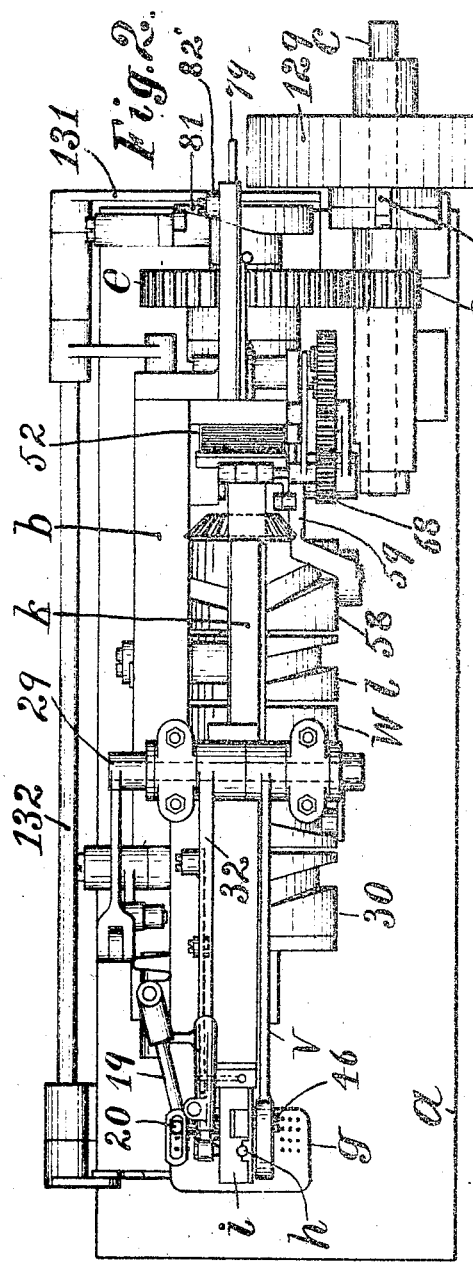
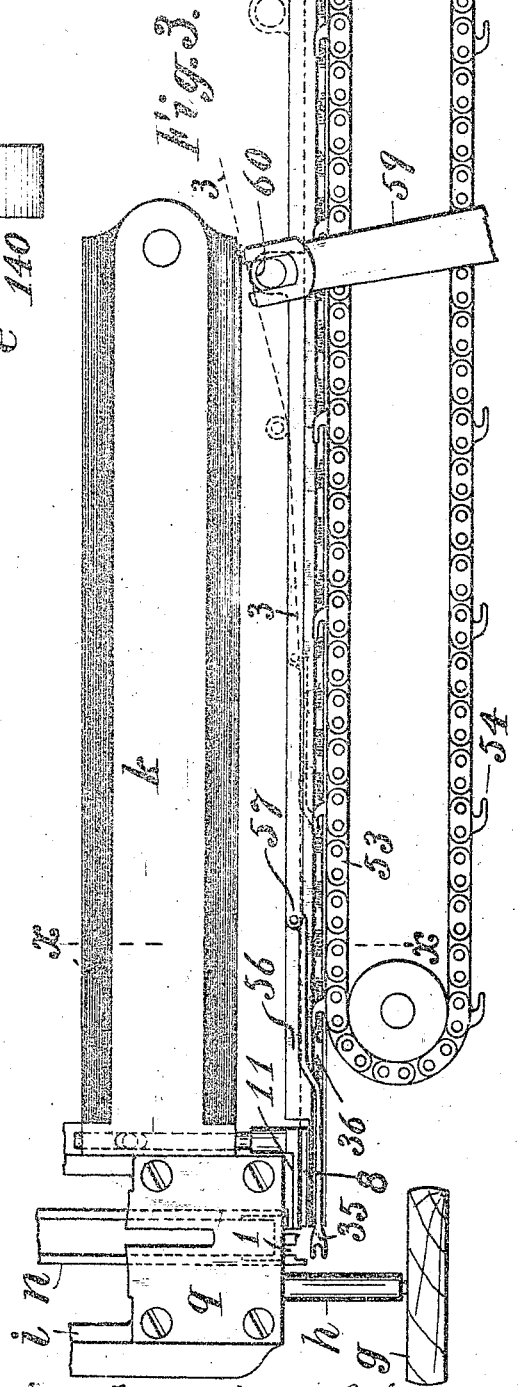

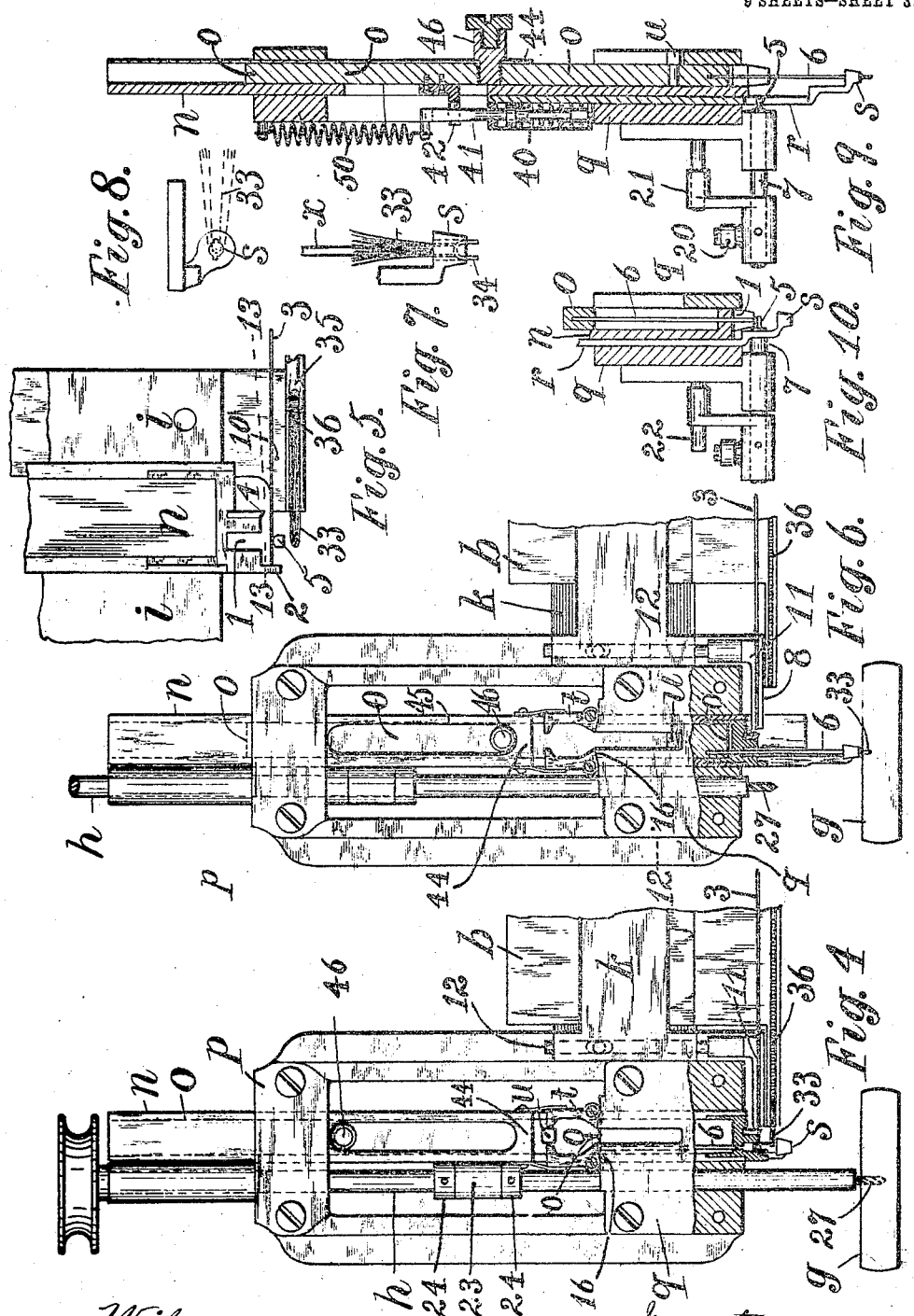

No. 855,810. PATENTED JUNE 4, 1907.
M. O. REHFUSS & E. F. BUCH.
MACHINE FOR DRILLING AND TUFTING BRUSHES.
APPLICATION FILED DEC. 20, 1905.

9 SHEETS—SHEET 4.

Witnesses:
L. Low
B. Marcus

Inventors.
Martin O. Rehfuss,
Edward F. Buch, per
Thos. S. Crane, Atty.

No. 855,810. PATENTED JUNE 4, 1907.
M. O. REHFUSS & E. F. BUCH.
MACHINE FOR DRILLING AND TUFTING BRUSHES.
APPLICATION FILED DEC. 20, 1905.
9 SHEETS—SHEET 5
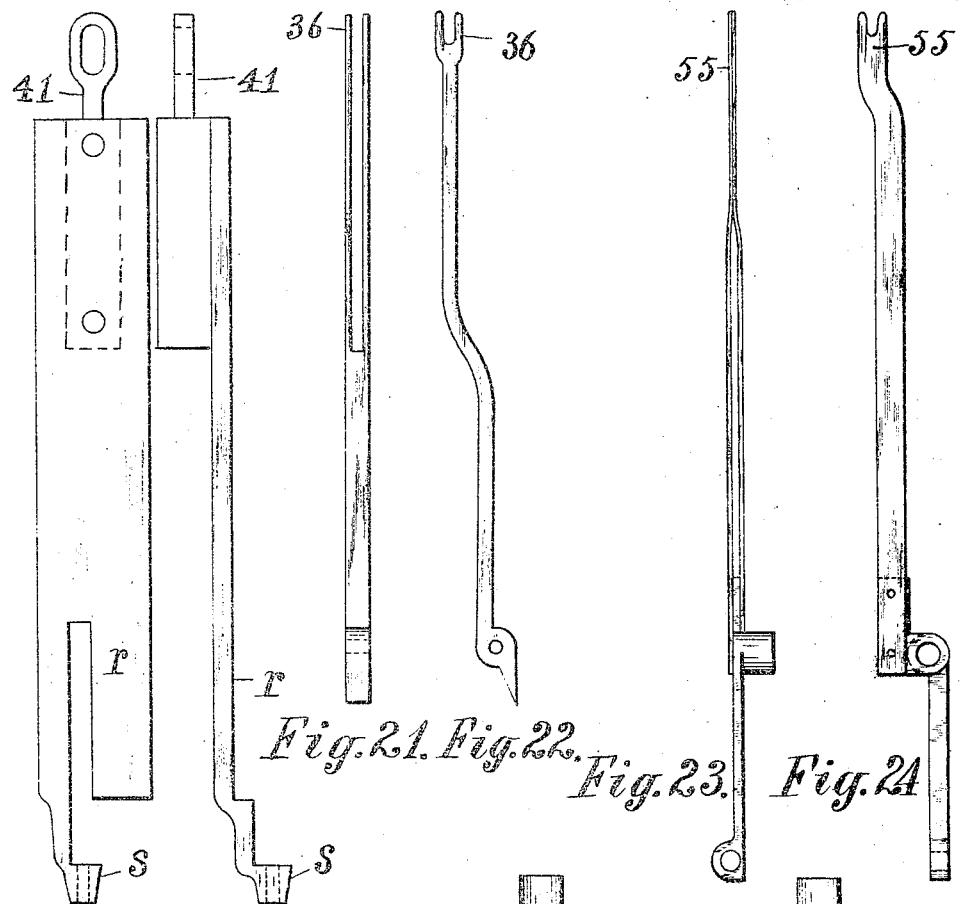
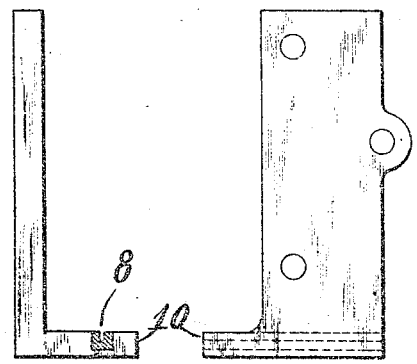
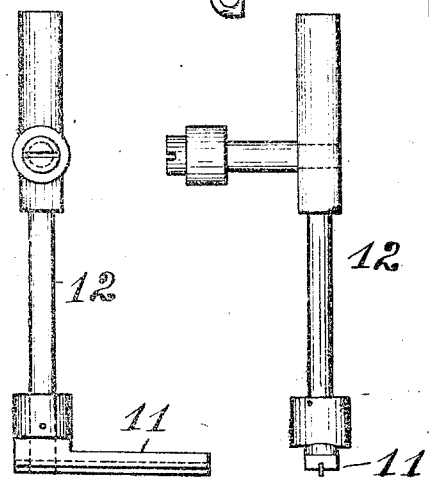
Witnesses:
L. Lee
Arthur F. Keaton
Inventors.
Martin O. Rehfuss,
Edward F. Buch, per
Thos. S. Crane, atty.

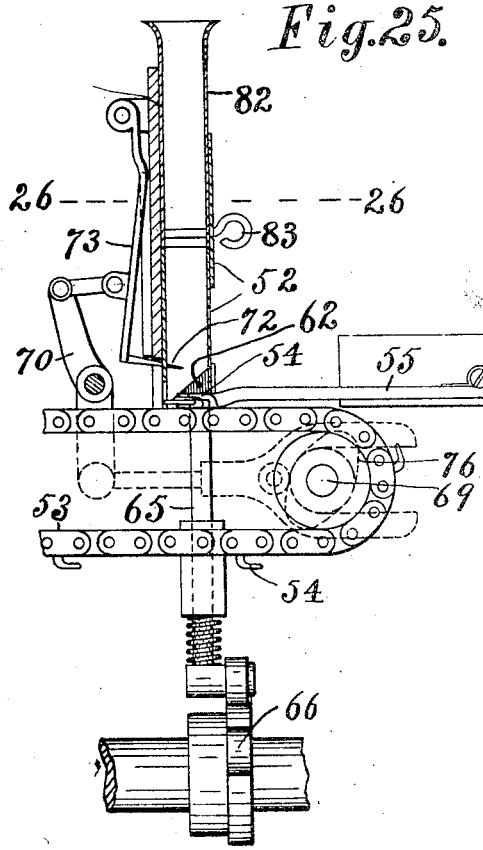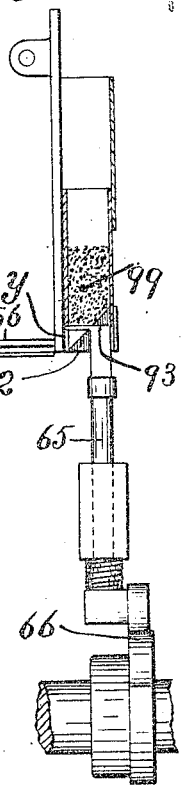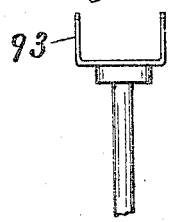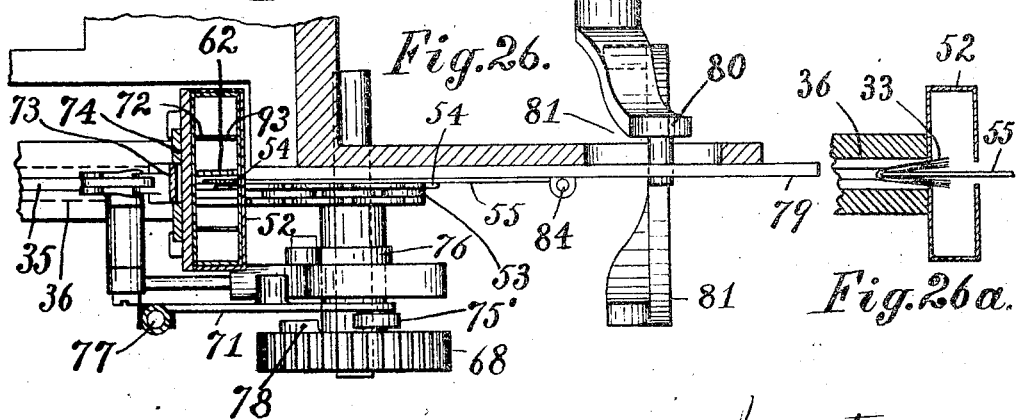

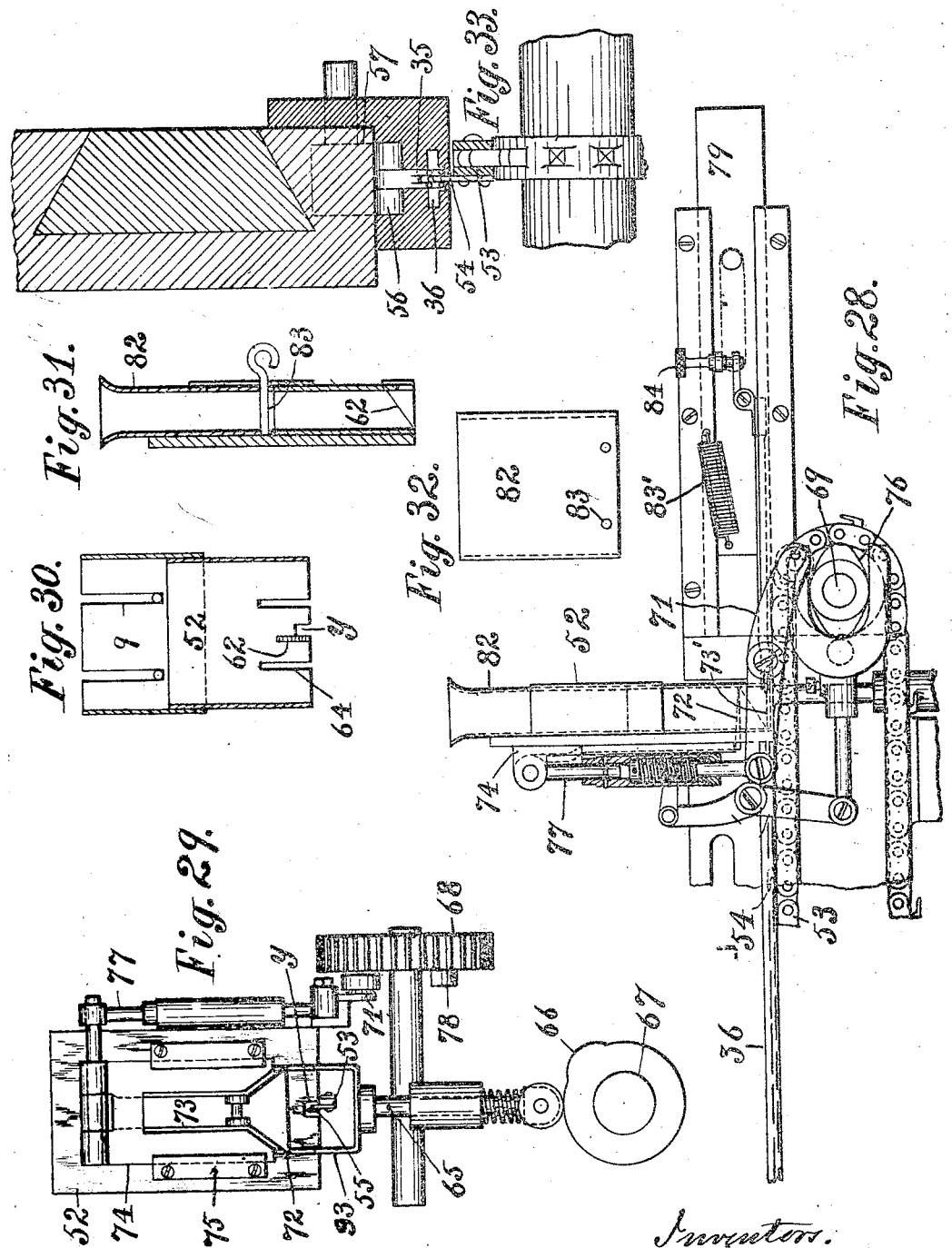

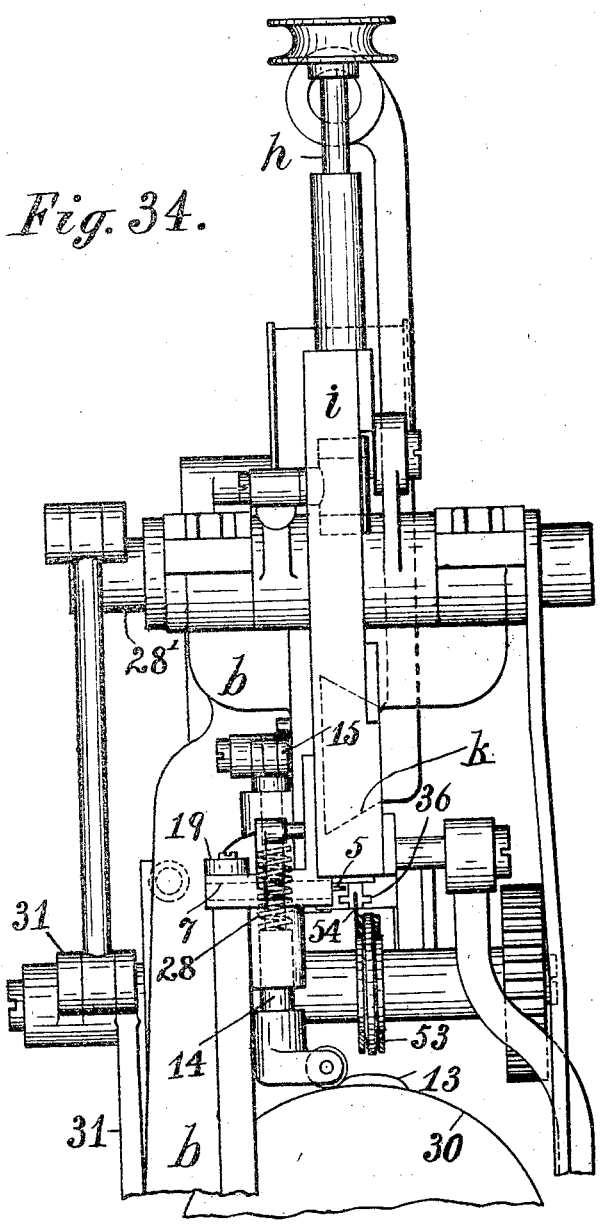

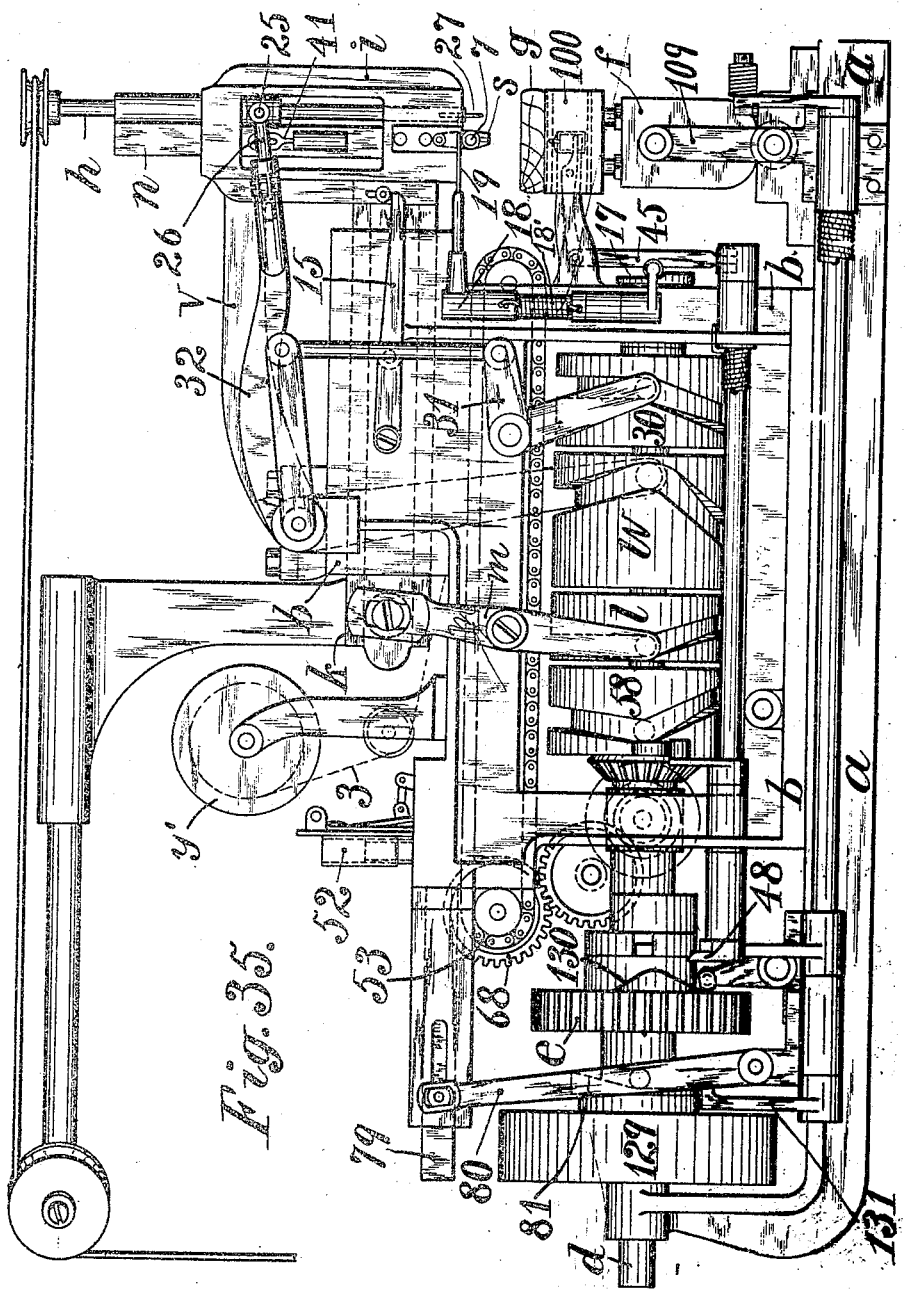

UNITED STATES PATENT OFFICE.

MARTIN O. REHFUSS, OF PHILADELPHIA, PENNSYLVANIA, AND EDWARD F. BUCH, OF ASTORIA, NEW YORK, ASSIGNORS, BY MESNE ASSIGNMENTS, TO SANITARY SECTIONAL BRUSH COMPANY, A CORPORATION OF NEW YORK.

MACHINE FOR DRILLING AND TUFTING BRUSHES.

No. 855,810.   Specification of Letters Patent.   Patented June 4, 1907.

Application filed December 26, 1905. Serial No. 292,657.

*To all whom it may concern:*

Be it known that we, MARTIN O. REHFUSS, of No. 1417 South Broad street, Philadelphia, Pennsylvania, and EDWARD F. BUCH, of Broadway and Academy streets, Astoria, Kings county, New York, citizens of the United States, have invented certain new and useful Improvements in Machines for Drilling and Tufting Brushes, fully described and represented in the following specification and the accompanying drawings, forming a part of the same.

This invention relates to a brush machine in which the brush-block is held stationary during the drilling of the block and the insertion of a tuft, and means for drilling a hole in the block and inserting a tuft are mounted upon a head which is movable transversely over the block to bring the drill and the tuft-driver alternately over the same point upon the block. The block requires to be shifted after tufting each hole.

Figure 11:
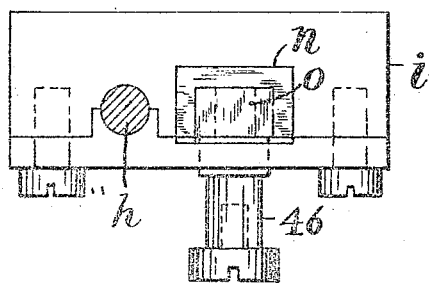
Figure 12:
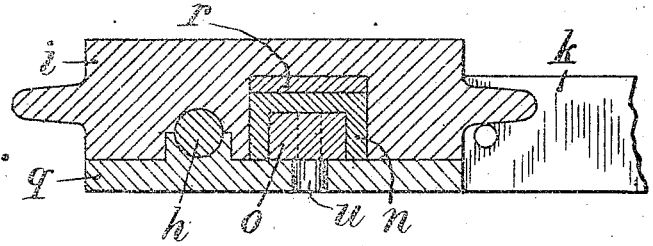
Figure 13:
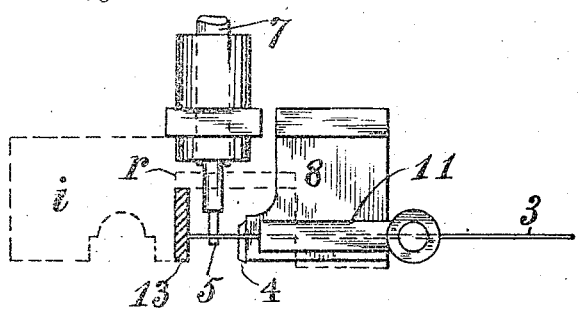
Figure 14:
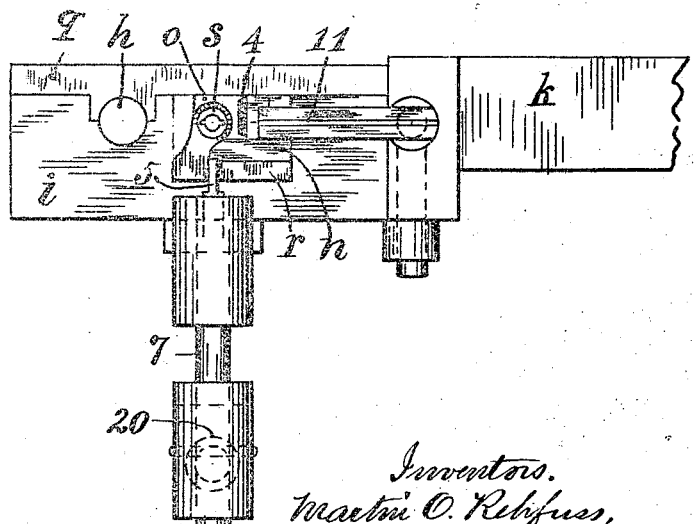

The object of the invention is to draw the required tuft of bristles from a quantity stored in a magazine, double the same to form a loop in a horizontal plane, feed a wire to suitable tools to cut off and form a staple with the prongs pointed downwardly, to feed the loop of the bristle-tuft below the fork of such staple, and drive the staple and tuft through a guide-socket into the hole in the brush-block. In carrying out this object, various novel constructions are employed, which will be fully understood by reference to the annexed drawing, in which Figure 1 is a side elevation of the machine; Fig. 2 is a plan of the same; Fig. 3 shows the reciprocating bar for the head with the lower part of the head and the means for delivering the tuft to the tuft-driver; Fig. 4 shows the head close to the adjacent end of the frame with a staple just formed and a tuft presented thereto, and the drill engaged with the brush-block; Fig. 5 shows, on a larger scale, the parts which form the staple with the wire fed to the cutter; Fig. 6 is a similar view to Fig. 1 with the head moved out from the frame, the tuft-guide lowered and the tuft inserted in the brush-block; Fig. 7 is an elevation of the tuft-guide, bristle-tuft, and staple upon a larger scale; Fig. 8 is a plan of the tuft-guide and its slide; Fig. 9 is a vertical section, where hatched, of the head and other parts at the center line of the tuft-driver, with the anvil retracted; and Fig. 10 shows the lower end of the same parts with the anvil projected beneath the tuft-driver. Fig. 11 shows the top of the head; Fig. 12 is a section on line 12—12 in Fig. 6; Fig. 13 is a section of the wire gage and cutter on line 13—13 in Fig. 5, with a plan of the adjacent parts and the head shown in dotted lines at the left of the wire gage; Fig. 14 is a view looking toward the bottom of the head, with the wire bed removed to show the wire clamp; Figs. 15 and 16 are an edge view and outside view of the wire bed; Figs. 17 and 18 are a side view and end view of the wire clamp; Figs. 19 and 20 are a side view and edge view of the tuft-guide and its slide; Figs. 21 and 22 are a plan and side view of the tuft-hook which removes the tuft from the magazine; Figs. 23 and 24 are a plan and side view of the tuft-placer which carries the tuft from the chain to the tuft-driver; Fig. 25 is a vertical longitudinal section of the bristle magazine with the means for loosening and pressing the bristles, and the hook to remove a tuft; Fig. 26 is a plan of the same in section on line 26—26 in Fig. 25; Fig. 26ª shows a plan of the magazine with the tuft-hook separating a tuft; Fig. 27 shows a vertical section of the magazine with the bristle lifter elevated; and Fig. 27ª shows the bristle lifter detached; Fig. 28 is a side elevation of the tuft-forming devices; Fig. 29 shows the front side of the tuft-forming devices; Fig. 30 shows the magazine with the front plate cut away, the view looking toward the right in Fig. 28; Fig. 31 is a vertical section of the magazine at the center line of Fig. 29, with a bristle supply box resting therein. Fig. 32 shows one side of the supply-box; and Fig. 33 is a section on line 33—33 in Fig. 3, including the entire tuft-placer. Fig. 34 shows the front end of tuft-forming devices enlarged; and Fig. 35 shows the rear side of the machine.

The machine is shown with bed $a$, frame $b$ carrying driving-shaft $c$ and cam-shaft $d$ with gears $e$ connecting the same. A carrier $f$ is shown for carrying the brush-block $g$, and would in practice be actuated to move the block at intervals for spacing the tuft-holes in rows, but such actuating means is not shown herein as it forms no part of the present invention, and it is understood that the brush remains stationary during the formation of a hole by drill 27 upon a drill-spindle $h$, which is mounted upon a head $i$ above the brush-block, and actuated by driving-cord $j$.

The head $i$ is attached to a bar $k$ reciprocated upon the frame by cam $l$ and lever $m$, and carries beside the drill-spindle a cutter-bar $n$ which forms the staple, a plunger $o$ movable within the cutter-bar to operate the tuft-driver 6, and a tuft-guide or socket $s$ having a slide $r$ movable at the back of the cutter-bar. The plunger $o$ is reciprocated by lever $v$ which is engaged therewith by means of a pin 46. These parts are clearly shown in Figs. 4 to 14 inclusive. The cutter-bar $n$ has a groove upon one side in which the plunger $o$ is movable, a cover-plate 44 upon the cutter-bar, Fig. 4, holding the plungers in place, and the pin 46 upon the plunger $o$ projects through a slot 45 in the cover-plate to engage the lever $r$.

The head has bearings $p$ and $q$ at the top and bottom for the drill-spindle $h$ and cutter-bar $n$, and the cutter-bar is furnished with spring-dogs $t$ to engage a stud $u$ upon the plunger $o$; which stud operates to move the cutter-bar downward a short distance to cut the wire, and form a staple therefrom during the first downward movement of the plunger $o$. The dogs are then automatically released from the stud, and a continued movement of the plunger carries the tuft-driver downward to force the staple and tuft through the tuft-guide, into the brush-block.

A bridge $n'$ at the bottom of the cutter-bar closes the groove in which the plunger reciprocates, and is perforated to form a guide for the tuft-driver 6, which moves through the same after the cutter-bar is arrested by the contact of the dogs $t$ with the seats 16. The bottom of the cutter-bar below the bridge is furnished as shown in Fig. 5, with a steel piece having a notch 1 to form the staple, a gage 2 for the wire 3, and a cutter 4 to sever the wire. An anvil 5 carried by a sliding shank 7 is movable transversely below the notch 1 (see Figs. 5, 9 and 10) and the wire 3 is supported upon a wire bed 10 carried by the head on a line with the top of the anvil 5, such bed having a groove 8, as shown in Fig. 15, to guide the wire beneath the cutter 4, and operating with the cutter 4, to sever the wire.

The anvil shaft 7 is provided with a hub carrying a roller 20, the hub being kept from turning by an eye 21 fixed to an arm on the hub, and sliding upon a stud projected from the back of the head, as shown in Figs. 9 and 10. The hub is reciprocated to move the anvil in and out below the cutter-bar by means of a rock-shaft 18 having at its upper end an arm 19 provided with a slot to receive the roller 20, as shown in Fig. 2. The body of the rock-shaft is provided with a spiral spring 18′ (as shown in Fig. 35) which spring presses the arm 19 normally toward the head, and thus holds the anvil normally beneath the cutter-bar in the position shown in Figs. 5 and 10. A cam 17 shown upon the forward end of the cam-shaft $d$ in Figs. 1 and 35, operates upon an arm projected from the lower end of the rock-shaft 18, and operates in opposition to the spring 18′ to retract the anvil from beneath the cutter-bar when required.

The cam 17 is upon the end of the shaft $d$ at one side of the rock-shaft, and an arm upon the lower end of the rock-shaft rests upon the face of the cam as shown in Fig. 35, so that at each rotation of the shaft $d$, the rock-shaft 18 is oscillated, and the arm 19 is drawn backwardly from the head $i$. Such movement occurs at a proper time to retract the anvil from the staple, before the staple is deposited in the tuft-guide $s$ by the descent of the tuft-driver.

The wire clamp 11 (see Figs. 4, 6, 17 and 18) has a shank 12 movable vertically upon the head, with a spring 28 which presses the clamp normally toward the wire bed. The shank 12 is raised to lift the clamp from the wire bed, when the head $i$ is moving toward the frame of the machine, by a cam 13, roller-bar 14 and lever 15. The wire-bed 10, whose groove 8 guides the wire to the cutter, is movable with the head $i$, as is also the clamp 11. A roller is shown in Fig. 35 over the point of the lever 15, such roller being supported upon the rear side of the shank 12 so that the movement of the lever operates to lift the wire clamp when the head is moving toward the frame $b$. (Figs. 34 and 35.) The wire is furnished by a reel $y'$ (see Fig. 1) and the wire clamp 11 grasps it when the head is in the position shown in Fig. 4; and when the head moves outward from the frame, draws sufficient wire from the reel to form a staple, as shown in Fig. 5. The wire clamp being released during the inward movement of the head, the wire is automatically fed across the anvil to the wire gage 2, as shown in Fig. 5, during such movement.

The cutter-bar requires but a slight downward movement, as shown in Fig. 6, and this is effected by the engagement of the stud $u$ (upon the plunger $o$) with the dogs $t$, which, at the end of the required movement, contact at their lower ends with seats 16 upon the bearing $q$ of the head; which causes them to separate and let the stud continue its downward movement.

The normal engagement of the stud with the upper ends of the spring dogs is shown in Fig. 1, the passage of the stud past them when they are separated is shown in Fig. 4, and the continued movement of the stud with the plunger o is shown in Fig. 6, where the plunger is shown in its extreme lower position, which carries the tuft-driver 6 downward with the tuft, as shown in Fig. 7. The cam w and lever v which actuate the plunger are thus enabled also, for a brief period, to actuate the cutter-bar to sever the wire. The movement of the cutter-bar not only severs the wire, as will be apparent by inspection of Fig. 5, but the notch 1 in the bar also bends the wire over the anvil 5 into staple-form, as shown in Fig. 4.

It will be obvious from the above description, that the same head which is movable over the brush-block for drilling and tufting holes in the block carries a tuft-driving socket movable vertically upon the head, a plunger movable vertically upon the head with a tuft-driver operated to pass through the tuft-guiding socket when driving the tuft, the staple-forming anvil movable upon the head above the tuft-guiding socket transverse to the path of the tuft-driver, means for placing loops of bristle-tufts between the anvil and the tuft-guiding socket, means for feeding wire across the anvil, a cutter-bar having a cutter and staple-former movable in line with the tuft-driver for severing the wire and bending a staple upon the anvil, and means operated by the tuft-driver during a continuous movement for temporarily engaging the cutter-bar, whereby the plunger which carries the tuft-driver performs a double function, as it not only propels the tuft-driver in a continuous movement, but imparts by the dogs t and stud u a temporary movement to the cutter-bar, to form the staple in a line with the tuft-driver and with the loops of the bristle-tufts.

A sleeve 23, fitted loosely to the drill-spindle h between collars 24, is provided with a pin 25, and is reciprocated by a cam 30 and a bell-crank 31, which latter is connected by rock-shaft 28' to an arm 32 having a sliding connection with a rod 26, fitted to the pin 25. (Fig. 35). The arm 32 has a tubular socket upon the end of it; and the rod 26, which has its outer end fitted to the pin 25, is formed with a cylindrical shank fitted to the socket upon the arm 32, which shank is fitted to slide in the socket. Such sliding joint maintains the engagement of the arm 32 with the pin 25 when the head i moves back and forth upon the frame b. The cam l and lever m are proportioned to move the head i upon the frame b of the machine a distance exactly equal to the space between the centers of the drill 27 and tuft-guide s, and when a hole is formed by the drill 27 the movement of the head outwardly brings the tuft-guide s and tuft-driver 6 directly over the hole to place the tuft therein.

Bristle tufts 33, formed with a horizontal loop, (as indicated by the dotted lines 33 in Fig. 8) are placed below the fork of the staple 34, as shown in Fig. 4, (see also Fig. 7) by a tuft-placer 35; the end of which is shown in Fig. 5 retracted after pushing a tuft from the tuft-channel 36. When the tufts are thus placed below the fork of the staple they are carried downward into the tuft-guide s by the tuft-driver 6, the slide r for the tuft-guide moving downward coincidently with the ram by the engagement of a dog 42 upon the back of the ram with a spring-pin 41 which projects from the top of a spring-box 40 attached to the slide, as shown in Figs. 19 and 20. The dog projects through a slot in the back of the cutter-bar, which allows the dog to contact with the spring-pin and force the tuft-guide s downward as the tuft-driver descends. The spring which supports the spring-pin 41 permits the dog to press the driver elastically upon the brush-block and thus maintain a close contact with blocks of various thicknesses, and compensates for the adjustment of the brush-block at various angles.

A spring 50 presses the slide r normally upward.

*Operation of tuft-driving devices.*—The operation of the parts upon the head, when supplied with a succession of horizontally looped tufts is as follows: The head being moved to its inner position shown in Fig. 4, the anvil 5 is pushed by the cam 17 beneath the cutter-bar, as shown in Fig. 10, and the wire is forced over the anvil 5, as shown in Fig. 5. The drill 27 is then depressed by its cam 30, as in Fig. 4, to drill a hole in the brush-block g, and immediately retracted to its initial position. During the drilling of the hole, the cam w moves the plunger o downward, engaging the stud u with the dogs t upon the cutter-bar, as shown in Fig. 1, which moves the cutter 4 from the position shown in Fig. 5 to the position shown in Fig. 4, thus severing a staple-blank and bending the wire over the anvil 5 to form a staple 34. (Fig. 7.) The cam 13 then allows the spring 28 to press the wire clamp 11, and the head i is moved outward from the frame by a cam l, drawing the wire with it in readiness to feed automatically below the cutter when the head is again retracted. The staple being formed, the anvil 5 is retracted as in Fig. 9, and the cutter-bar is then arrested, as shown in Figs. 4 and 6, by the contact of the dogs 4 with the seats 16 upon the bearing q, which releases the stud u, and the downward movement of the plunger continues, carrying the tuft-driver 6 into contact with the staple and engaging the fork of the staple with the loop of the bristle-tuft 33, and forcing both into the staple-guide s, as shown in Fig. 7. The proximity of the parts to secure this operation is shown in Fig. 4, the tuft 33 being supported in the tuft-channel 36 until engaged with a staple, which drags it out of the channel as it is forced into the tuft-guide. As the tuft-driver continues its downward movement, the tuft-guide s is moved downward by the action of the dog 42 upon the spring-pin 41, into its lowest position, the same as in Fig. 6. The tuft being inserted in the brush-block, the cam w raises the plunger o to set the tuft-driver again above the anvil, the stud u operating to raise the cutter-bar to its initial position by contact with a cover-plate 44 upon the cutter-bar. (Figs. 4 and 6.) The parts are thus all restored to their initial position, and the head is in readiness to be moved inward, as shown in Fig. 4. so as to project the drill again into the brush-block; which block, so far as the present invention is concerned, may be moved in any desired manner to space the rows of holes apart upon the block. Automatic mechanism for effecting such spacing is shown in our co-pending application No. 292,658 filed December 20, 1905, for appliance for feeding brush blocks.

The looped tufts are made in the machine from loose bristles carried in a magazine 52 (Fig. 25) which stands over a chain 53 having chain-hooks 54 to carry tufts 33 of bristles from the magazine (through the tuft-channel 36) as near as possible to the tuft-driver. A tuft-hook 55 adjustable to grasp a greater or smaller number of the bristles, is reciprocated through slots y in the sides of the magazine, to separate the tuft therefrom, as shown in Fig. 26ª, and the hooks upon the chain travel close to the side of such tuft-hook, as shown in Fig. 26, to remove the tuft therefrom; and when the tufts are carried by the chain as near as possible to the tuft-driver 6, a tuft-placer 35 is reciprocated by the side of the hook within the tuft-channel, to transfer the tuft from the same to the position below the anvil and the staple, shown in Fig. 5.

The tuft-hook 55 forms a horizontal loop at the middle of the bristles in each tuft, and the tuft-channel 36 is formed, as shown in Fig. 33, to receive the side wings of each tuft (which are shown separately in dotted lines 33 in Fig. 8) and hold the tuft in its horizontal position. The chain 53 is arranged to travel over the cam-shaft $d$, and the tuft-channel 36 is extended over the same and beneath the bar $k$ (as seen in Fig. 33) which reciprocates the head $i$, the channel 36 having an open slot in the bottom, as shown in Fig. 3 and 33, for the chain-hooks 54 to carry the tufts forward below the head $i$. Above the channel 36 is a slide-way 56 (Fig. 33) in which a slide 57 is reciprocated by cam 58 and lever 59, (Figs. 1, 2 and 3), the lever engaging a pin 60 projecting from the side of the slideway 56 through a slot 61, as shown in Fig. 1.

A bristle-support 62 (Figs. 30 and 31) sustains the bristles in the lower part of the magazine and slopes toward the front side of the magazine, as shown in Fig. 31, to gather a small quantity of the bristles in the front corner.

Slots 9 are formed in the rear side of the magazine (Figs. 30 and 31), and the bristles are inserted in the magazine by first filling a supply-box 82 having an open bottom, as shown in Fig. 31, with the bristles retained therein by pins 83. The supply-box is made to fit inside the top of the magazine, the pins passing down into the slots 9 and when the pins are withdrawn the contents of the supply-box drop into the magazine. The bristles are agitated by lifters 93 fitted to vertical slots 64 in the side of the magazine and lifted after the removal of each tuft by a rod 65 and cam 66. (Figs. 25 and 27.) This cam is mounted upon a shaft 67, shown in Fig. 1, which is connected by gears 68 (shown in dotted lines in Fig. 1, to avoid obscuring the other parts) with a shaft 69 to drive one of the chain-wheels, and also to actuate levers 70 and 71 to press the bristles downward after each movement of the lifters 63.

The pressers 72 are formed as prongs upon a swing-plate 73 which is hinged upon a slide 74 movable vertically upon the front side of the magazine between gibs 75 (Figs. 28 and 29). The prongs project through the slots 64 in the front side of the magazine when the swing-plate is pressed toward the magazine by the lever 70 and the operation of the cam 76 upon the shaft 69. The prongs, when thus moved into the magazine, are pressed downward by the lever 71 which is connected by a spring link 77 with the slide 74; the cam 78 for the lever 71 being attached to the inner side of one of the gears 68 and operating upon a roller 75' on the outer side of such lever. (See Fig. 26.)

The prongs 72 readily penetrate the bristles when forced into the magazine and crowd downward the portion below the prongs with the force regulated by the spring in the spring connecting link 77.

The tuft-hook 55 is pivoted by pin 78 upon a reciprocating-bar 79, and has an arm which is adjusted by a screw 84 journaled in an ear 85 upon the bar. Such screw serves to elevate or depress the point of the tuft-hook and thus cause it to engage, and remove from the bottom of the magazine, a greater or less quantity of the bristles to form a tuft or knot. The bar 79 is actuated by a lever 80 and a cam 81, which acts upon a roll 82' and the lever, (as shown in Fig. 2), and the bar is retracted by a spring 83, shown in Fig. 28.

It will be noticed from the above description that the head $i$ is movable over the brush-block to bring the drill and tuft-driver alternately over the same point, that the ram $o$ carrying the tuft-driver is mounted within the cutter-bar so as to operate centrally over the staple, as shown in Fig. 4, when the staple is formed, that the plunger by means of the stud $u$ and dogs $t$ moves the cutter-bar sufficiently to cut off the wire blank in forming the staple, that the wire is fed to the cutter by the inward movement of the head upon the frame $b$ and is then clamped by the foot 11 to draw the wire from the reel, that the bristles are loosened in the magazine and again compressed before withdrawing each tuft, that the tuft-hook 55 is adjustable to vary the amount of bristles for each tuft, and that the chain-hooks 54 and tuft-placer 35 deliver the tuft between the staple and the tuft-guide $s$. These operations are all performed automatically by the continued rotation of the cam-shaft $d$, and can be effected so rapidly that a hole may be drilled in the brush-block and a tuft inserted about once in every second of time.

The operation of the parts is such that they are adapted for co-operative use with any suitable means of holding the brush-block and shifting it beneath the drill and tuft-driver in the desired manner, and the block-feeding devices are not fully shown or claimed herein, as they may be varied indefinitely.

Having thus set forth the nature of the invention what is claimed herein is:

1. In a brush machine, the combination, with the vertical rectangular magazine 52 having the notch $y$ in its front side, of the inclined bristle support 62 in the bottom, the tuft-hook 55 reciprocated transversely of the bottom through the notch $y$, and the lifter 93 movable vertically adjacent to the support 62, to loosen up the bristles prior to each movement of the tuft-hook 55.

2. In a brush machine, the combination, with a vertically disposed magazine having a tapering bristle-support 62 in the bottom and a notch $y$ in its front side, of the tuft-hook 55 reciprocated transversely across the bottom of the magazine and adapted to double the tuft by drawing it through the front notch, a tuft-channel adjacent to the magazine to receive the doubled tuft, and having a vertical groove in the bottom, and a chain having chain-hooks 54 movable in such groove to remove the tufts from such tuft-hook.

3. In a brush machine, the combination, with a vertically disposed bristle-magazine, of a lifter operating through the bottom of the magazine to loosen up the bristles, a slide upon the magazine with presser hinged thereon and having prongs to penetrate the bristles, a cam with connections for reciprocating the slide, and a spring inserted in such connections to press the packer prongs downward and means for removing bristles in tufts from the magazine.

4. In a brush machine, the combination, with a vertically disposed bristle magazine, of a lifter operating through the bottom of the magazine to loosen up the bristles, a slide upon the magazine with presser hinged thereon and having prongs to penetrate the bristles, a cam with connections to oscillate the presser and insert the prongs into the bristles, and a cam with connections having a spring inserted therein to press the prongs elastically downward and means for removing bristles in tufts from the magazine.

5. In a brush machine, the combination, with the rectangular vertically disposed magazine 52 having the notch $y$ in its front side, and tapering bristle-support 62 extended wholly across the bottom to support the bristles, and a presser for intermittingly pressing the bristles downward, of the channel 36 extended from the notch $y$, the tuft-hook 55 reciprocated transversely across the bottom of the magazine and into the channel through the notch $y$, and intersecting the middle of the bristles to separate and double a tuft and deposit the looped tuft in the channel, and a chain with hooks movable in the tuft-channel to carry the tuft away from the tuft-hook.

6. In a brush machine, the combination, with the rectangular vertically disposed magazine 52 having the notch $y$ in its front side, and tapering bristle support 62 extended wholly across the bottom to support the bristles, and a presser for intermittingly pressing the bristles downward, of the channel 36 extended from the notch $y$, the tuft-hook 55 reciprocated transversely across the bottom of the magazine and into the channel through the notch $y$, and intersecting the middle of the bristles to separate and double a tuft and deposit the looped tuft in the channel, a chain with hooks movable in the channel to carry the tuft away from the tuft-hook, and a tuft-placer operated in the channel to remove the tuft from the chain-hooks and place it beneath a tuft-driver.

7. In a brush machine, the combination, with a rectangular vertically disposed bristle magazine having a notch $y$ in the front and the tapering bristle support 62 extended wholly across the bottom to support the bristles, of the channel 36 extended from the notch $y$, the tuft-hook 55 reciprocated transversely across the bottom of the magazine and into the channel through the notch $y$, and intersecting the middle of the bristles to separate and double a tuft and deposit the looped tuft in the channel, a chain 53 with hooks 54 movable in the tuft-channel 36 to carry the tuft away from the tuft-hook, and the tuft-placer 35 movable in the channel to remove the tuft from the chain-hook and place its loop beneath the staple, to be carried with the same through the tuft-guide by the tuft-driver.

8. In a brush machine, the combination, with means for holding the brush-block stationary during the drilling of a hole and insertion of a tuft therein, of a head movable transversely over the brush-block, a drill-spindle and a tuft-driver movable upon such head, and means for automatically shifting the head to bring the drill and tuft-driver alternately over the same point in the brush-block.

9. In a brush machine, the combination, with a head having a tuft-driver movable vertically thereon, of a tuft-guide movable vertically below the tuft-driver, means for placing a staple between the tuft-guide and the retracted end of the tuft-driver, means for delivering a tuft between the staple and the tuft-guide, and means for carrying the tuft-driver, the staple, the tuft and the tuft-guide downward simultaneously.

10. In a brush machine, the combination, with the tuft guiding socket $s$, of means for forming a staple over the same, means for placing a tuft doubled in a horizontal plane and placing the loop of the tuft between the staple and socket, and a tuft-driver to force the staple downwardly with the loop of the tuft into the tuft guiding socket.

11. In a brush machine, the combination, with means for holding the brush-block stationary during the drilling of a hole and insertion of a tuft therein, of the vertical head $i$ having a horizontal slide $k$ fitted to suitable guides, a drill-spindle and a tuft-driver movable vertically upon the head, a cam for automatically shifting the slide to move the head into two positions with the drill and tuft-driver alternately over the same point in the brush-block, and holding the head in the two positions, and means for alternately depressing the drill and the tuft-driver in the two positions of the head.

12. In a brush machine, the combination, with the head $i$ movable transversely over the brush block, and a tuft-guiding socket movable vertically upon the head, of a plunger movable vertically upon the head with a tuft-driver to pass through the tuft-driving socket, means for placing loops of bristle tufts horizontally between the tuft-driver and the tuft-guiding socket, means for presenting staples over the loops of the bristle-tufts, and means for moving the tuft-driver to depress the staple and engage the loops of the bristle-tufts, and carry both staple and bristle-tuft downward into the tuft-guiding socket.

In testimony whereof we have hereunto set our hands in the presence of two subscribing witnesses.

MARTIN O. REHFUSS.
EDWARD F. BUCH.

Witnesses as to M. O. Rehfuss:
  THOS. S. CRANE,
  J. GEO. REHFUSS.

Witnesses as to E. F. Buch:
  CHARLES A. FELTERS,
  THOMAS S. CRANE.